March 26, 1929.                A. O. DRAKE                1,707,078
                     COMBINED SIFTING AND MIXING DEVICE
                            Filed July 24, 1928.

Inventor
Andrew O. Drake.
By
Attorney

Patented Mar. 26, 1929.

1,707,078

UNITED STATES PATENT OFFICE.

ANDREW O. DRAKE, OF DENVER, COLORADO.

COMBINED SIFTING AND MIXING DEVICE.

Application filed July 24, 1928. Serial No. 295,076.

This invention relates to improvements in devices for sifting and mixing flour and other ingredients.

In cooking and baking it is oftentimes desirable to very intimately mix the flour with the baking powder or soda, and it has been found that this can be most thoroughly accomplished by passing the flour several times through a sieve. It has also been found that when flour is sifted several times in succession that it becomes very much lighter than when it is sifted only once and this fluffy condition of the flour is very desirable in the production of cakes and biscuits.

It is the object of this invention to produce a device by means of which flour can be conveniently sifted a plurality of times so that any ingredients with which it is mixed will become thoroughly intermingled with the flour and so that the flour will assume a fluffy state and thus become better adapted for fancy cakes and pastry.

In order to more clearly describe this invention so that its construction and mode of operation can be readily understood, reference will be had to the accompanying drawing in which the preferred embodiment thereof has been illustrated, and in which.

Figure 1:
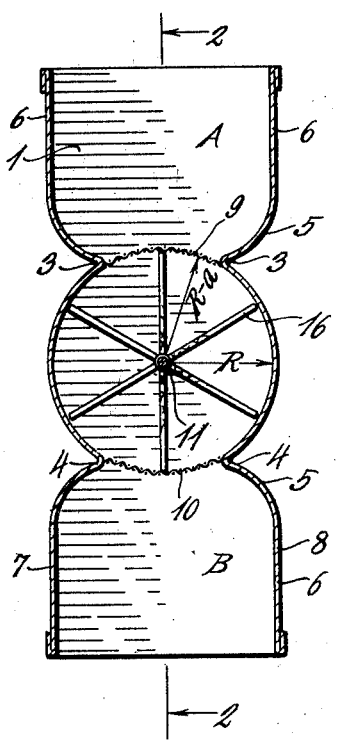
Fig. 1 is a vertical section taken on line 1—1, Fig. 2.
Figure 2:
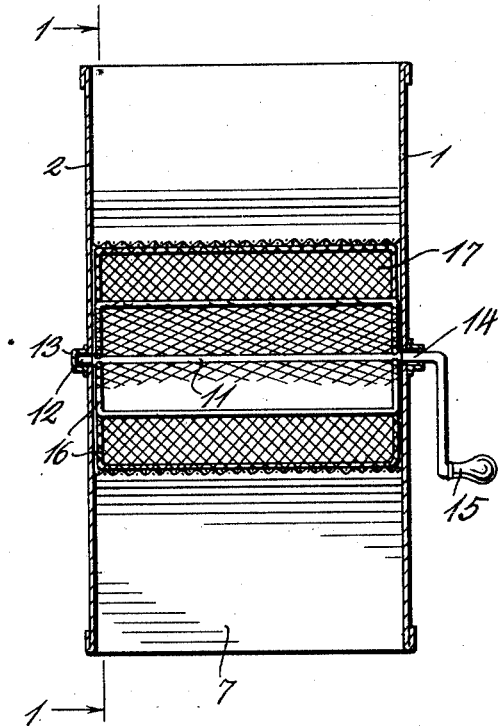
Fig. 2 is a section taken on line 2—2, Fig. 1.

In the drawing numeral 1 represents one of the vertical sides of the device, and numeral 2 the other side. The vertical sides are formed from sheets of metal such as tin or aluminum and have their opposite edges curved in the arc of a circle between points 3 and 4. From point 3 upwardly the edge is preferably curved in the manner indicated by numeral 5 until it becomes tangent to the straight portion 6. The same shape prevails below the points 4. The side members 1 and 2 are connected by sides 7 and 8 which are also formed of sheet metal and which are bent so as to conform to the shape of sides 1 and 2, and are secured to the latter by means of solder. The central arcuate portions between points 3 and 4 are curved on a radius R. The points 3 of sides 7 and 8 are connected by means of a curved section of screen which has been indicated by reference numeral 9, and in a similar manner the points 4 are connected by means of a screen 10. The screens 9 and 10 are curved on a radius R minus $a$, which is slightly less than radius R.

Figure 3:
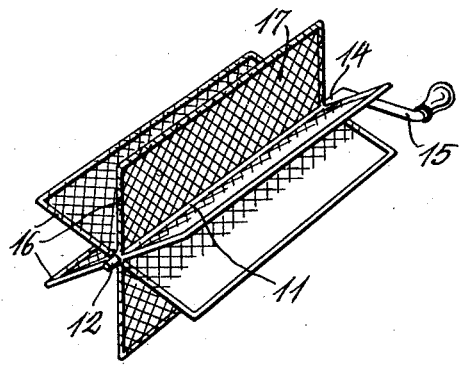
Fig. 3 is a perspective view of the rotatable screen.

Located within the circular chamber formed between screens 9 and 10 and the arcuate walls is a rotary screen comprising an axle or core 11 which is provided at one end with a trunnion 12. This trunnion extends through an opening in the wall 2 and is enclosed by means of a cap 13 soldered to the outer surface of this wall. The other end of core 11 is provided with a trunnion 14 that has attached to its outer end a crank 15, by means of which the core 11 can be rotated. Secured to the core 11 and extending radially therefrom are six wire frames 16. These frames carry wire screens 17 of the proper mesh. These screens have their inner edges secured to the axle or core 11 by solder and the width of these screens is such that the outer edges of the screens will come in contact with the inner surface of screens 9 and 10, but will be spaced a very short distance from the inner surface of the arcuate side portions between points 3 and 4. When the rotary screen illustrated in Fig. 3 is rotated, the outer edges of the screens will engage screens 9 and 10 as above intimated and will facilitate the passage of the flour through these screens. It is, of course, possible to dispense with screen 9 in which case the space between the radial screens 17 will fill up with flour which will be carried across the upper surface of screen 10. When screen 9 is omitted the mixing action will not be as effective and the device will not be as desirable but will still be as serviceable as the ordinary sieves.

Let us now assume that the upper compartment which has been designated by A is filled with flour and that the rotary screen is turned by means of crank 15. Flour will now pass through screen 9 and will fall onto the radial screens of the rotor. Some of the flour will pass through these radial screens and onto the screen below and when the flour reaches screen 10, a portion of it will pass through this screen, but the greatest part of the flour will continue to travel with the rotary screen and will pass many times through the different radial screens before it passes into compartment B. It is evident that any flour that is sifted by means of this sieve will be sifted many times in succession and if it is mixed with other ingredients, the mixture will become very intimate during the rotation of the rotary screen. It is evident, therefore, that by means of this simple sieve construction that a multiple screening effect and a very thorough mixing is obtained in a simple and convenient manner.

Having described my invention what is claimed as new is:

1. A combined mixer and sifter comprising a container open at both ends, a cylindrical chamber between the ends of said container, wire screens separating the cylindrical chamber from the open ends and a rotary sieve located within the cylindrical chamber.

2. A combined mixer and sifter comprising an open ended container of substantially rectangular cross section, said container having a substantially cylindrical chamber formed in part by arcuate partitions of wire screen which separate the interior of the partition from the end portions of the container, a rotatable screening device located within the cylindrical chamber, said device having a plurality of radial screens and means for rotating said device.

3. A combined mixer and sifter comprising, in combination, an elongated container of substantially rectangular cross section, said container being provided intermediate its ends with a cylindrical chamber, the interior of said chamber being separated from the ends of the container by means of arcuate wire screens forming portions of the wall of the cylindrical chamber, a rotary screening device located within the cylindrical chamber, said device having a plurality of radial screens and means for rotating the screening device.

4. A device of the class described comprising a container open at both ends, said container having a chamber located between the open ends, the two opposite sides of the chamber being formed of portions curved outwardly about a common axis, the bottom of the chamber being formed by a section of wire screen curved about the same axis as the sides and having the same radius of curvature as the sides and a rotary sieve located in the chamber, said sieve having a plurality of sieves extending radially from its axis of rotation.

In testimony whereof I affix my signature.

ANDREW O. DRAKE.